United States Patent
Matsuura et al.

(10) Patent No.: US 7,155,981 B2
(45) Date of Patent: Jan. 2, 2007

(54) STRAIN SENSOR WITH FIXING MEMBERS

(75) Inventors: Akira Matsuura, Osaka (JP); Shinjiro Ueda, Osaka (JP); Toshiro Otobe, Fukui (JP); Yasunobu Kobayashi, Fukui (JP); Katsuhiko Omoto, Fukui (JP); Yasunori Matsukawa, Fukui (JP); Toshiharu Motofusa, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 149 days.

(21) Appl. No.: 10/489,511

(22) PCT Filed: Sep. 12, 2002

(86) PCT No.: PCT/JP02/09375

§ 371 (c)(1),
(2), (4) Date: Oct. 5, 2004

(87) PCT Pub. No.: WO03/025531

PCT Pub. Date: Mar. 27, 2003

(65) Prior Publication Data

US 2005/0034528 A1 Feb. 17, 2005

(30) Foreign Application Priority Data

Sep. 14, 2001 (JP) .............................. 2001-279936

(51) Int. Cl.
*G01B 7/16* (2006.01)
(52) U.S. Cl. ........................................................ 73/781
(58) Field of Classification Search ................................
73/862.621–862.624, 781

See application file for complete search history.

(56) References Cited

U.S. PATENT DOCUMENTS

| | | | | |
|---|---|---|---|---|
| 4,703,816 A | * | 11/1987 | Saner .......................... | 177/229 |
| 4,738,135 A | * | 4/1988 | Cadwell et al. ............... | 73/786 |
| 5,456,119 A | * | 10/1995 | Nakazaki et al. ............. | 73/841 |
| 2002/0125049 A1 | * | 9/2002 | Kajiyama et al. ............ | 177/136 |

FOREIGN PATENT DOCUMENTS

| | | |
|---|---|---|
| JP | 05-057605 | 7/1993 |
| JP | 11-211543 A | 8/1999 |
| JP | 11-351952 A | 12/1999 |
| JP | 2000-180255 A | 6/2000 |
| JP | 2000-292283 A | 10/2000 |

(Continued)

OTHER PUBLICATIONS

International Search Report for application No. PCT/JP02/09375 dated Oct. 29, 2002.

*Primary Examiner*—Max Noori
(74) *Attorney, Agent, or Firm*—RatnerPrestia (57) ABSTRACT

A strain sensor improved in detection accuracy without variation of bending stresses applied to the strain detecting element. The sensor substrate has a first fixing hole at one end and a second fixing hole at the other end, a detecting hole at the center, and at least one strain detecting element on the upper surface or lower surface thereof. The first fixing member is press-fitted into the first fixing hole. The second fixing member is press-fitted into the second fixing hole. The detecting member is press-fitted into the detecting hole. Further, when an external force is applied to the detecting member, strain generated due to the positional shift of the detecting member is detected by the strain detecting element with respect to the first fixing member and the second fixing member.

7 Claims, 12 Drawing Sheets

FOREIGN PATENT DOCUMENTS

JP 2001-330522 A 11/2001
JP 2002-202210 A 7/2002

\* cited by examiner

STRAIN SENSOR WITH FIXING MEMBERS

This application is a U.S. National Phase Application of PCT International Application PCT/JP02/09375.

TECHNICAL FIELD

The present invention relates to a strain sensor for detecting strain generated in a sensor substrate due to external forces produced by weights of men and vehicles such as automobiles by means of strain detecting elements mounted on the sensor substrate.

BACKGROUND ART

As a conventional strain sensor of this type, the one disclosed in the microfilm of Utility Model H4-265 (Japanese Laid-open Utility Model H5-57605) is well-known.

A conventional strain sensor will be described in the following with reference to the drawings.

Figure 13:
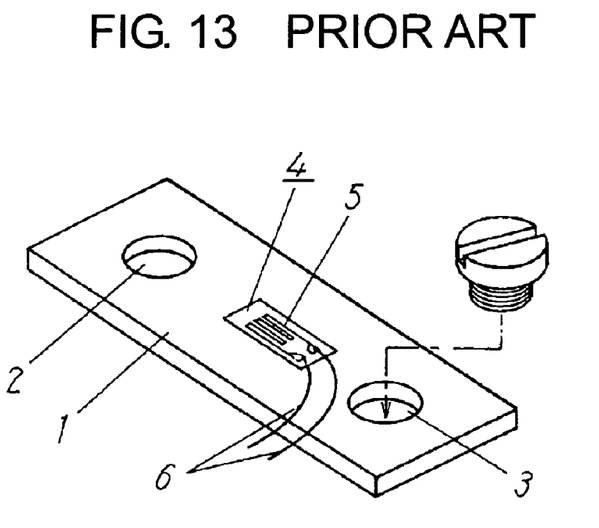
FIG. 13 is a perspective view of a conventional strain sensor.

FIG. 13 is a perspective view of a conventional strain sensor.

In FIG. 13, sensor substrate 1 made of metal has first fixing hole 2 at one end and second fixing hole 3 at the other end, on which is disposed strain detecting sensor 4 having a thin gauge for detecting strain in a lengthwise direction.

Also, strain detecting element 4 is electrically connected to element section 5 and is also provided with lead 6 outwardly extended.

The operation of a conventional strain sensor configured as described above is explained with reference to the drawings.

Figure 14:
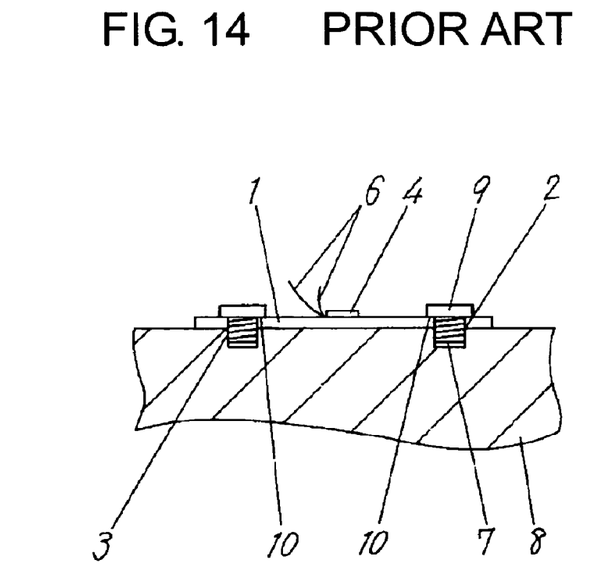
FIG. 14 is a side sectional view showing a state that the strain sensor is fixed to a detecting member, which is an essential portion in the perspective view of the conventional strain sensor.

As shown in FIG. 14, sensor substrate 1 is fixed by male screw 9 onto detecting member 8 provided with a pair of female screws 7. In this case, taking into account the variation of pitch of the pair of female screws 7 formed in detecting member 8, the inner diameters of first fixing hole 2 and second fixing hole 3 are a little larger than the outer diameter of female screw 7 so that sensor substrate 1 can be reliably fixed on detecting member 8.

In this condition, when an external force is applied to detecting member 8, sensor substrate 1 is deformed in accordance with strain in detecting member 8. As sensor substrate 1 is deformed, resistance value of strain detecting element 4 disposed on the top surface of sensor substrate 1 varies. The variation of the resistance value is taken out from lead 6 in the form of voltage variation when a current flows to detecting element 4. In this way, the external force generated at detecting member 8 is detected.

In the conventional configuration described above, the inner diameters of first fixing hole 2 and second fixing hole 3 are a little larger than the outer diameter of female screw 7. Therefore, it is possible to reliably install sensor substrate 1 onto detecting member 8. On the other hand, when an external force is applied to detecting member 8, the installing position of sensor substrate 1 shifts in the lengthwise direction of sensor substrate 1. This causes the position of end portion 10 of male screw 9 being in contact with the top surface of sensor substrate 1 to be shifted. Accordingly, the bending stress applied to strain detecting element 4 is varied as well. As a result, the output accuracy of the strain sensor will be deteriorated.

SUMMARY OF THE INVENTION

The present invention is intended to provide a strain sensor which may assure the improvement of detection output accuracy without variation of the bending stress applied to the strain detecting element.

The strain sensor of the present invention has a configuration as described in the following.

The sensor substrate of the strain sensor is provided with a first fixing hole at one end and a second fixing hole at the other end, a detection hole at the center, and at least one strain detecting element at the top or bottom thereof. A first fixing member is press-fitted into the first fixing hole. A second fixing member is press-fitted into the second fixing hole. A detecting member is press-fitted into a detecting hole. Further, when an external force is applied to the detecting member, strain caused due to the positional shift of the detecting member in relation to the first fixing member and the second fixing member is detected by the strain detecting element.

In this configuration, the first fixing member, the second fixing member and the detecting member are respectively press-fitted into the first fixing hole, the second fixing hole and the detecting hole. Accordingly, when an external force is applied to the detecting member, the respective end positions of the detecting member, the first fixing member, and the second fixing member which are in contact with the sensor substrate are free from positional shifting. Consequently, the bending stress applied to the strain detecting element is stabilized. Accordingly, the detection output accuracy of the strain sensor will be improved.

Thus, it is possible to obtain a strain sensor which may assure the improvement of detection accuracy without variation of the bending stress applied to the strain detecting element.

DETAILED DESCRIPTION OF THE PREFERRED EMBODIMENTS (Preferred Embodiment 1)

The preferred embodiment 1 of the present invention will be described in the following with reference to FIG. 1 to FIG. 7.

Figure 1:
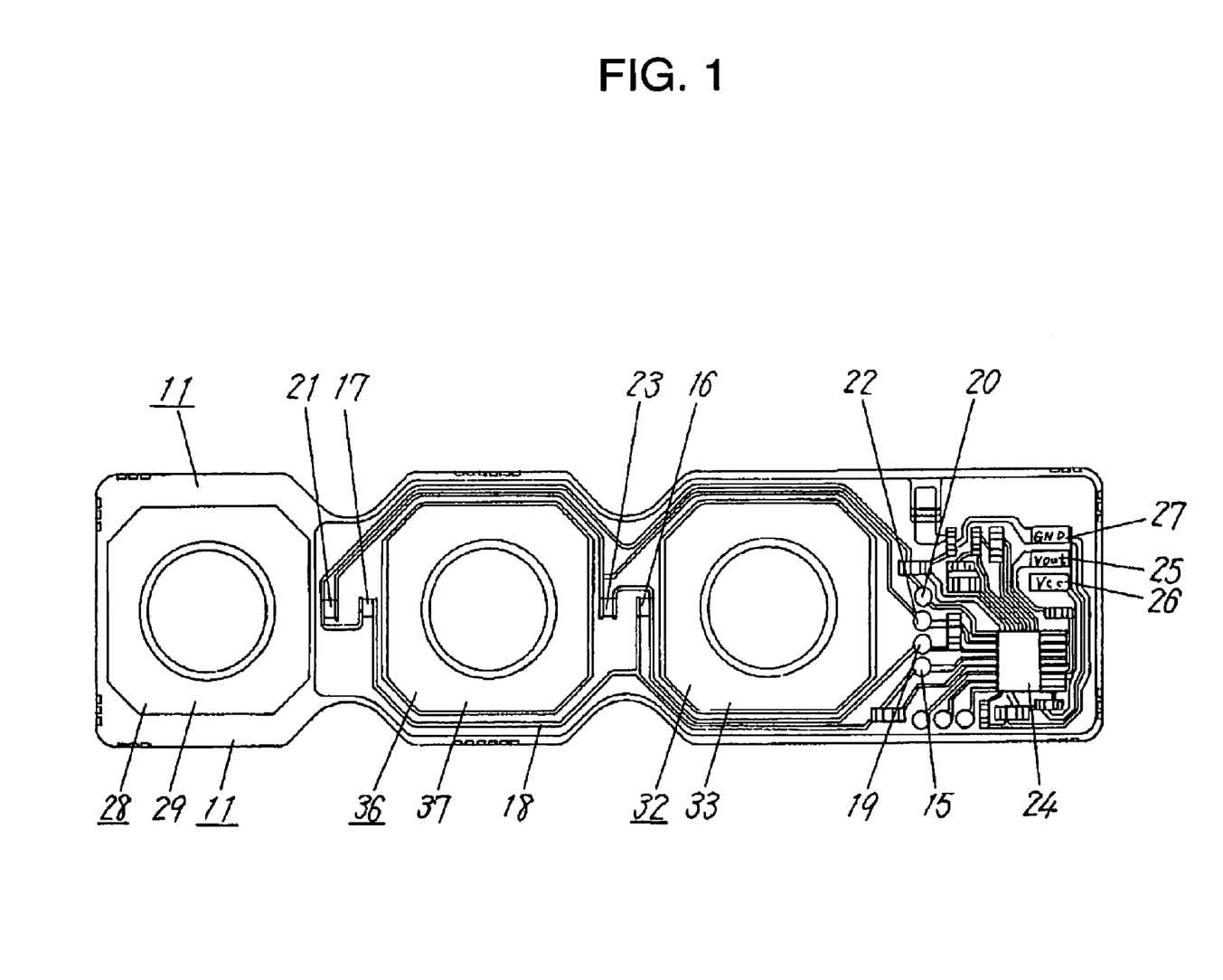
FIG. 1 is a top view of a strain sensor in the preferred embodiment 1 of the present invention.

FIG. 1 is a top view of a strain sensor in the preferred embodiment 1 of the present invention.

Figure 2:
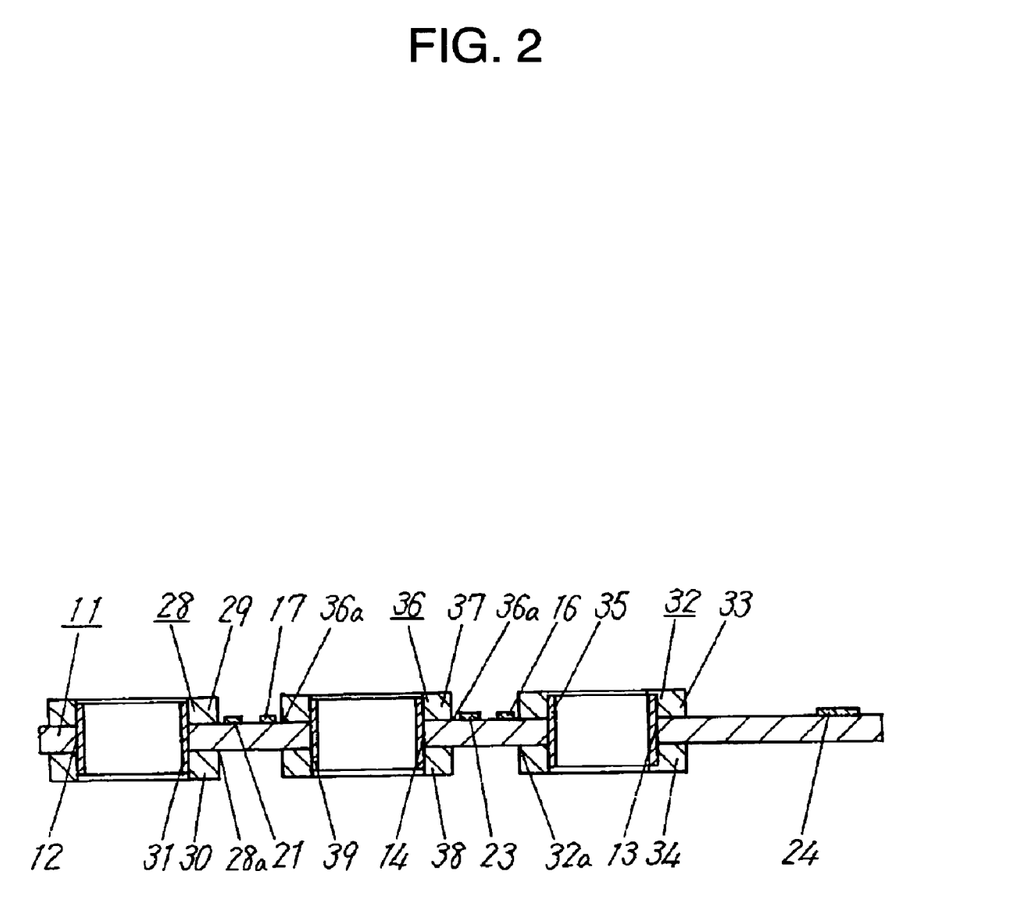
FIG. 2 is a side sectional view of a strain sensor in the preferred embodiment 1.

FIG. 2 is a side sectional view of the strain sensor.

Figure 3:
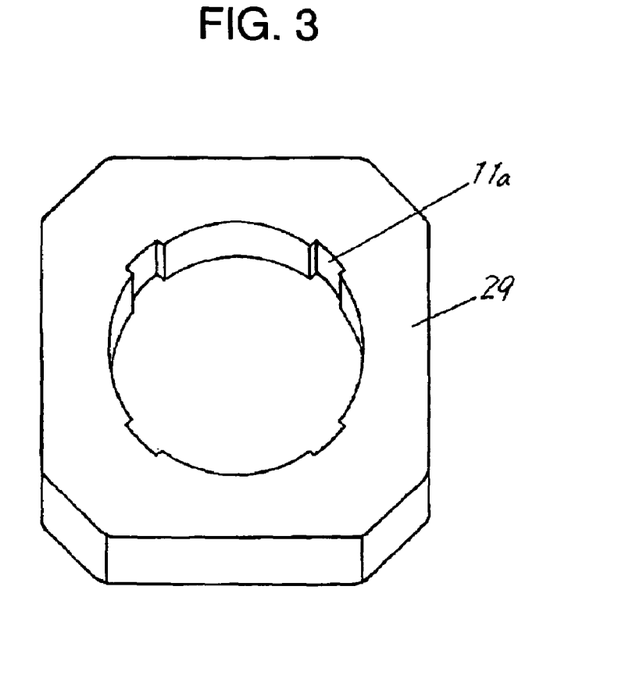
FIG. 3 is a perspective view of a first upper washer, essential portion of the strain sensor, in the preferred embodiment 1.

FIG. 3 is a perspective view of a first upper washer in the strain sensor.

Figure 4:
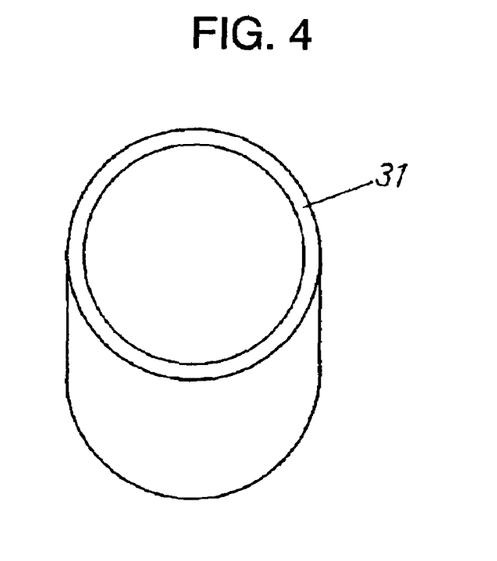
FIG. 4 is a perspective view of a first cylinder, essential portion of the strain sensor, in the preferred embodiment 1.

FIG. 4 is a perspective view of a first cylinder in the strain sensor.

Figure 5:
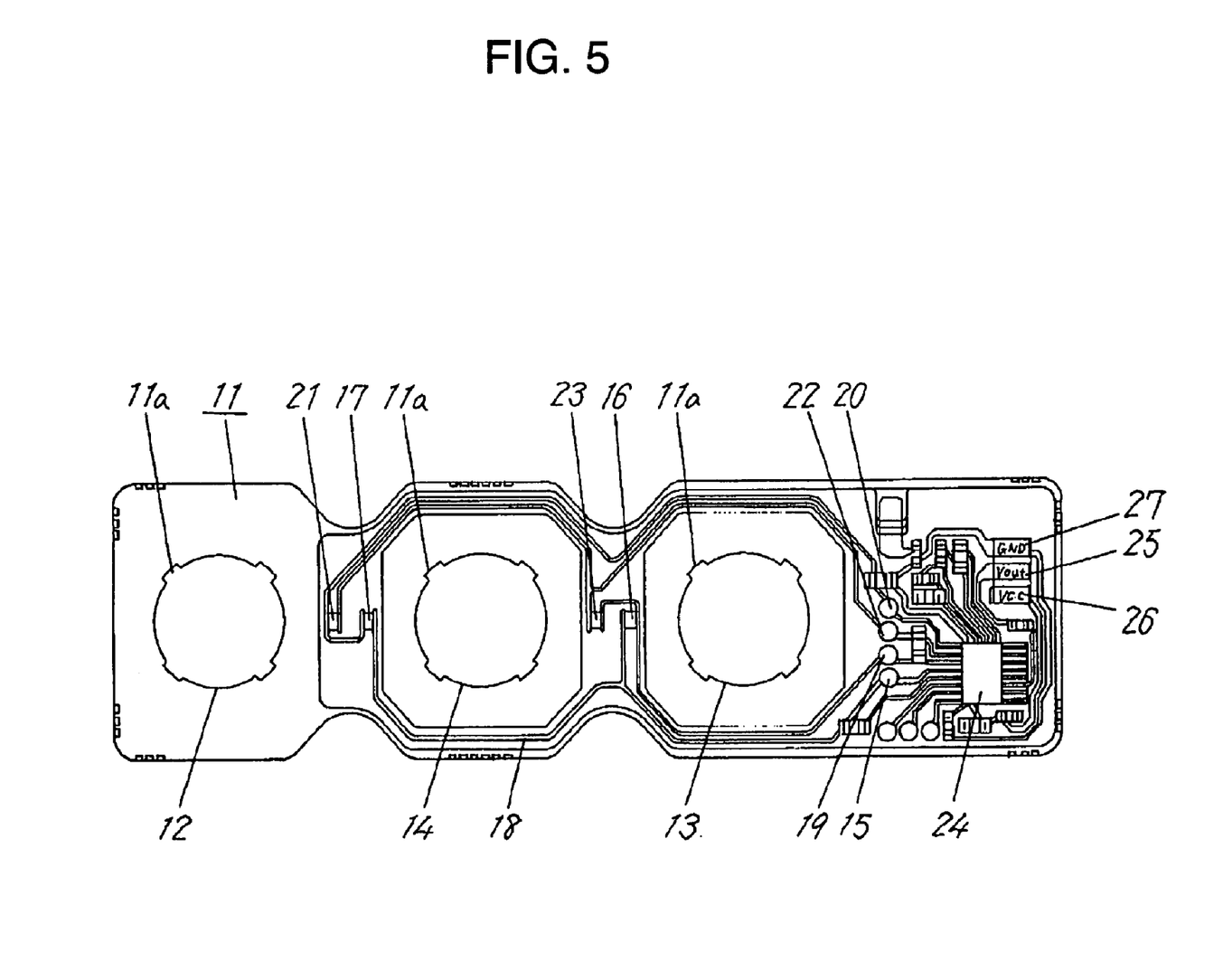
FIG. 5 is a top view of a sensor substrate, which is an essential portion of the strain sensor, in the preferred embodiment 1.

FIG. 5 is a top view of a sensor substrate in the strain sensor.

Figure 6:
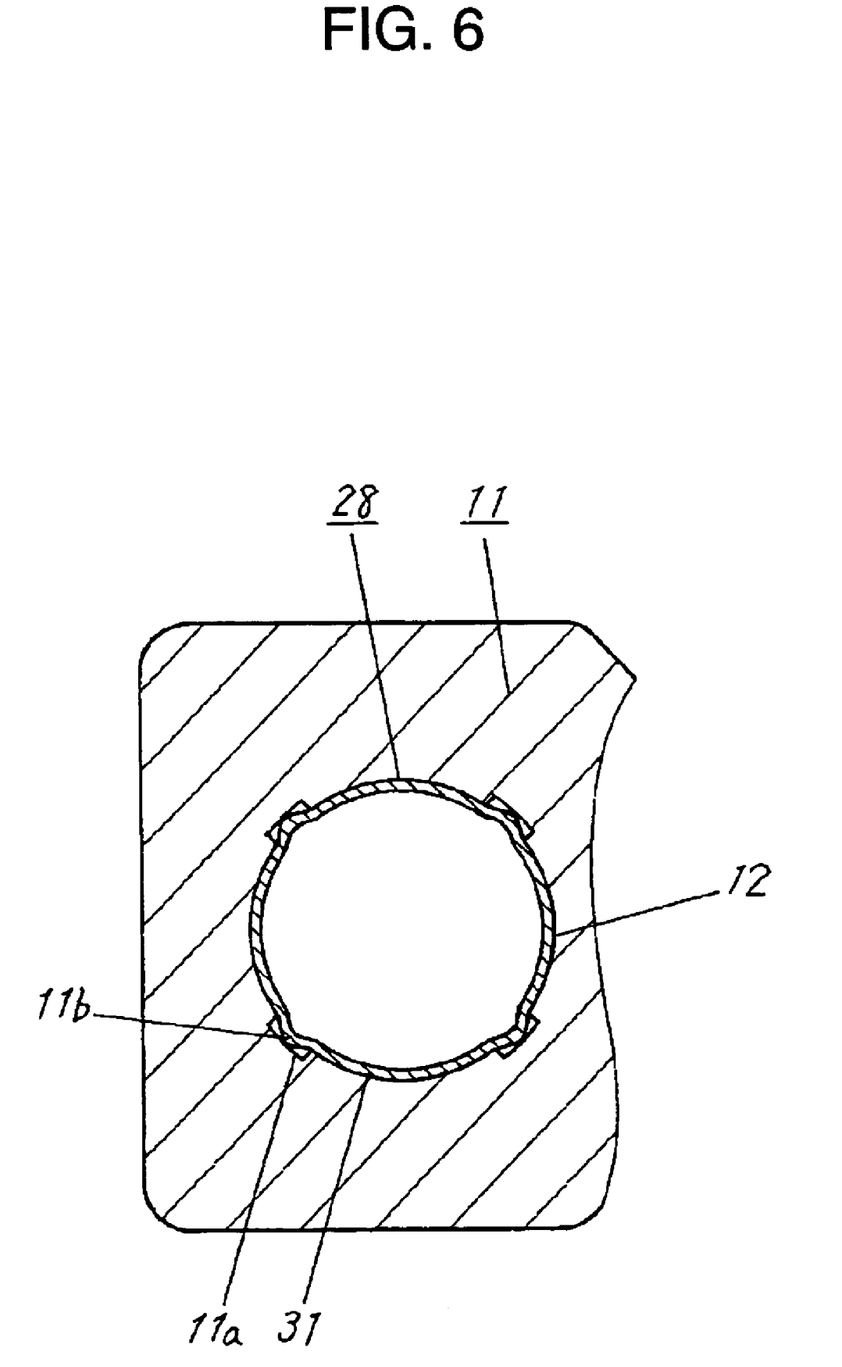
FIG. 6 is a sectional view showing the structure of a locking means for locking a first fixing member to the sensor substrate, which is an essential portion of the strain sensor, in the preferred embodiment 1.

FIG. 6 is a sectional view showing the structure of a locking means for locking a first fixing member to a sensor substrate of the strain sensor.

As shown in FIG. 5, sensor substrate 11 is provided with first fixing hole 12 ranging from top to bottom at one end, second fixing hole 13 ranging from top to bottom at the other end, and detecting hole 14 ranging from top to bottom at the center thereof.

Also, first fixing hole 12, second fixing hole 13, and detecting hole 14 of sensor substrate 11 are respectively provided with recesses 11a at the inner sides thereof.

Also, power electrode 15 is provided at the other end of sensor substrate 11. Power electrode 15 is electrically connected to one end of first strain detecting element 16 and one end of second strain detecting element 17 via circuit pattern 18.

In this case, the other end of first strain detecting element 16 is electrically connected to first output electrode 19.

Further, the other end of second strain detecting element 17 is electrically connected to one end of second output electrode 20 and one end of third strain detecting element 21. The other end of third strain detecting element 21 is electrically connected to ground (GND) electrode 22.

Also, fourth strain detecting element 23 is disposed on the top surface of sensor substrate 11. One end of fourth strain detecting element 23 is electrically connected to the other end of first strain detecting element 16 and to first output electrode 19. The other end of fourth strain detecting element 23 is electrically connected to GND electrode 22.

First strain detecting element 16, second strain detecting element 17, third strain detecting element 21, fourth strain detecting element 23, power electrode 15, first output electrode 19, second output electrode 20, GND electrode 22 and circuit pattern 18 configure a bridge circuit.

Also, IC 24 is disposed on the top surface at the other side of sensor substrate 11. The IC 24 amplifies the differential voltage between the voltages of first output electrode 19 and second output electrode 20 and to deliver the output from external output electrode 25 disposed at the other end of sensor substrate 11.

Further, external power electrode 26 is disposed on the top surface at the other side of sensor substrate 11. External power electrode 26 is electrically connected to power electrode 15.

Also, external GND electrode 27 disposed on the top surface of sensor substrate 11 is electrically connected to GND electrode 22.

First fixing member 28 shown in FIG. 1 and FIG. 2 includes first upper washer 29, first lower washer 30, and first cylinder 31.

In this case, first upper washer 29 is formed of metal having a shape as shown in FIG. 3, and the underside thereof comes in contact with the top surface of sensor substrate 11.

First lower washer 30 is configured in the same way as that for first upper washer 29, and the top surface thereof comes in contact with the underside of sensor substrate 11.

First cylinder 31 is formed of thin metal as shown in FIG. 4.

First cylinder 31 is press-fitted into the inner sides of first upper washer 29, first lower washer 30, and first fixing hole 12.

Also, first upper washer 29 and first lower washer 30 are respectively provided with recesses 11a at the inner sides thereof.

As shown in FIG. 6, the outer side of first cylinder 31 partially gets into these recesses 11a and recesses 11a of first fixing hole 12, thereby locking first fixing member 28 to sensor substrate 11.

In this way, as shown in FIG. 6, locking means 11b for first fixing member 28 is configured.

Second fixing member 32, in the same manner as that for the first fixing member 28, includes second upper washer 33 made of metal, second lower washer 34, and second cylinder 35 formed of thin metal.

Second cylinder 35 is press-fitted into the inner sides of second upper washer 33, second lower washer 34, and second fixing hole 13. Further, second upper washer 33 and second lower washer 34 are respectively provided with recesses 11a at the inner sides thereof. The outer side of second cylinder 35 partially gets into these recesses 11a and recesses 11a of second fixing hole 13, thereby locking second fixing member 32 to sensor substrate 11. In this way, locking means 11b for second fixing member 32 is configured.

Detecting member 36 includes detector upper washer 37 made of metal, detector lower washer 38, and detecting cylinder 39 formed of thin metal.

Detecting cylinder 39 is press-fitted into the inner sides of detector upper washer 37, detector lower washer 38, and detecting hole 14. Detector upper washer 37 and detector lower washer 38 are respectively provided with recesses 11a at the inner sides thereof. The outer side of detecting cylinder 39 partially gets into these recesses 11a and recesses 11a of detecting hole 14, thereby locking detecting member 36 to sensor substrate 11. In this way, locking means 11b for detecting member 36 is configured.

In the strain sensor of the preferred embodiment 1 of the present invention, when an external force is applied to detecting member 36, the external force is applied to end portion 36a where detecting member 36 comes in contact with sensor substrate 11. Then, a force (reaction force) in the opposite direction of the external force is applied to end portion 28a where first fixing member 28 comes in contact with the sensor substrate 11. Further, a reaction force is also applied to end portion 32a where second fixing member 32 comes in contact with sensor substrate 11.

The strain sensor is configured as described above. Accordingly, end portion 36a where detecting member 36 comes in contact with sensor substrate 11, end portion 28a where first fixing member 28 comes in contact with sensor substrate 11, and end portion 32a where second fixing member 32 comes in contact with sensor substrate 11 are free from positional shifting.

As a result, bending stresses applied to first strain detecting element 16, second strain detecting element 17, third strain detecting element 21, and fourth strain detecting element 23 are stabilized. Accordingly, the output accuracy of the strain sensor will be improved.

Also, first fixing member 28, second fixing member 32, and detecting member 36 are provided with locking means 11b. Therefore, first fixing member 28, second fixing member 32, and detecting member 36 do not rotate about the axial centers of first fixing hole 12, second fixing hole 13, and detecting hole 14 respectively.

Consequently, end portion 36a of detecting member 36, end portion 28a of first fixing member 28, and end portion 36a of second fixing member 36, coming in contact with sensor substrate 11, are free from positional shifting.

Accordingly, bending stresses applied to first strain detecting element 16, second strain detecting element 17, third strain detecting element 21, and fourth strain detecting element 23 are further stabilized. Thus, the output accuracy of the sensor will be further improved.

The assembling method of the strain sensor in the preferred embodiment 1 of the present invention which is configured as described above is explained in the following.

First, first fixing hole 12, second fixing hole 13, and detecting hole 14 are formed by press machining in a metallic base material (not shown). Also, recesses 11a are formed by press machining at the respective inner sides thereof. In this case, press machining causes burrs to be produced at positions around first fixing hole 12, second fixing hole 13 and detecting hole 14 of the base substrate (not shown).

Next, after glass paste (not shown) is printed on the top surface of the base material (not shown), the base material is burnt at about 850° C. for about 45 minutes to form sensor substrate 11.

Subsequently, metal-glazed carbon paste is printed on the top surface of sensor substrate 11, followed by burning at about 850° C. for about 45 minutes. Thus, first strain detecting element 16, second strain detecting element 17, third strain detecting element 21, and fourth strain detecting element 23 are formed on top surface of the sensor substrate 11.

Next, silver paste is printed at a position where an electrode and circuit pattern 18 are disposed, followed by burning at about 850° C. for about 45 minutes. Thus, power electrode 15, first output electrode 19, second output electrode 20, GND electrode 22, external output electrode 25, external output electrode 26, external GND electrode 27, and circuit pattern 18 are formed.

Next, IC24 is mounted on the top surface of sensor substrate 11.

Next, after first lower washer 30 is in contact with the lower side of first fixing hole 12 of sensor substrate 11, first upper washer 29 is placed on upper side of first fixing hole 12.

Subsequently, first cylinder 31 is press-fitted into the inner sides of first fixing hole 12, first lower washer 30 and first upper washer 29. In this case, the outer side of first cylinder 31 is locked in recesses 11a provided at the inner sides of first upper washer 29, first lower washer 30 and first fixing hole 12.

Next, after second lower washer 34 is in contact with the lower side of second fixing hole 13, second upper washer 33 is placed on the upper side of second fixing hole 13.

Next second cylinder 35 is press-fitted onto the inner surfaces of second fixing hole 13, second lower washer 34, and second upper washer 33. In this case, the outer side of second cylinder 35 is locked in recesses 11a provided at the inner sides of second upper washer 33, second lower washer 34 and second fixing hole 13.

Subsequently, after detector lower washer 38 is in contact with the lower side of detecting hole 14 of sensor substrate 11, detector upper washer 37 is placed at the upper side of detecting hole 14.

Finally, detecting cylinder 39 is press-fitted into the inner sides of detecting hole 14, detector lower washer 38 and detector upper washer 37. In this case, the outer side of detecting cylinder 39 is locked in recesses 11a provided at the inner sides of detector upper washer 37, detector lower washer 38 and detecting hole 14.

In this configuration, thin first cylinder 31 is shrunk and press-fitted into the inner sides of first upper washer 29, first lower washer 30 and first fixing hole 12. Also, second thin cylinder 35 is shrunk and press-fitted into the inner sides of second upper washer 33, second lower washer 34 and second fixing hole 13. Further, detecting thin cylinder 39 is shrunk and press-fitted into the inner sides of detector upper washer 37, detector lower washer 38 and detecting hole 14.

The above press-fitting operation may be easily performed. Accordingly, it is possible to provide a strain sensor improved in convenience for assembling.

In addition, first upper washer 29, first lower washer 30, and first fixing hole 12 are provided with recess 11a. Recess 11a is locked by the outer side of first cylinder 31.

Further, second upper washer 33, second lower washer 34, and second fixing hole 13 are also provided with recess 11a. Recess 11a locks the outer side of second cylinder 35.

Further, detector upper washer 37, detector lower washer 38, and detecting hole 14 are provided with recess 11a. Recess 11a locks the outer side of detecting cylinder 39.

Due to such a configuration, first fixing member 28, second fixing member 32 and detecting member 36 can be easily provided with locking means 11b.

As a result, it is possible to easily provide a strain sensor having locking means 11b.

The operation of the strain sensor in the preferred embodiment 1 of the present invention which is configured and manufactured as described above will be described in the following with reference to the drawings.

Figure 7:
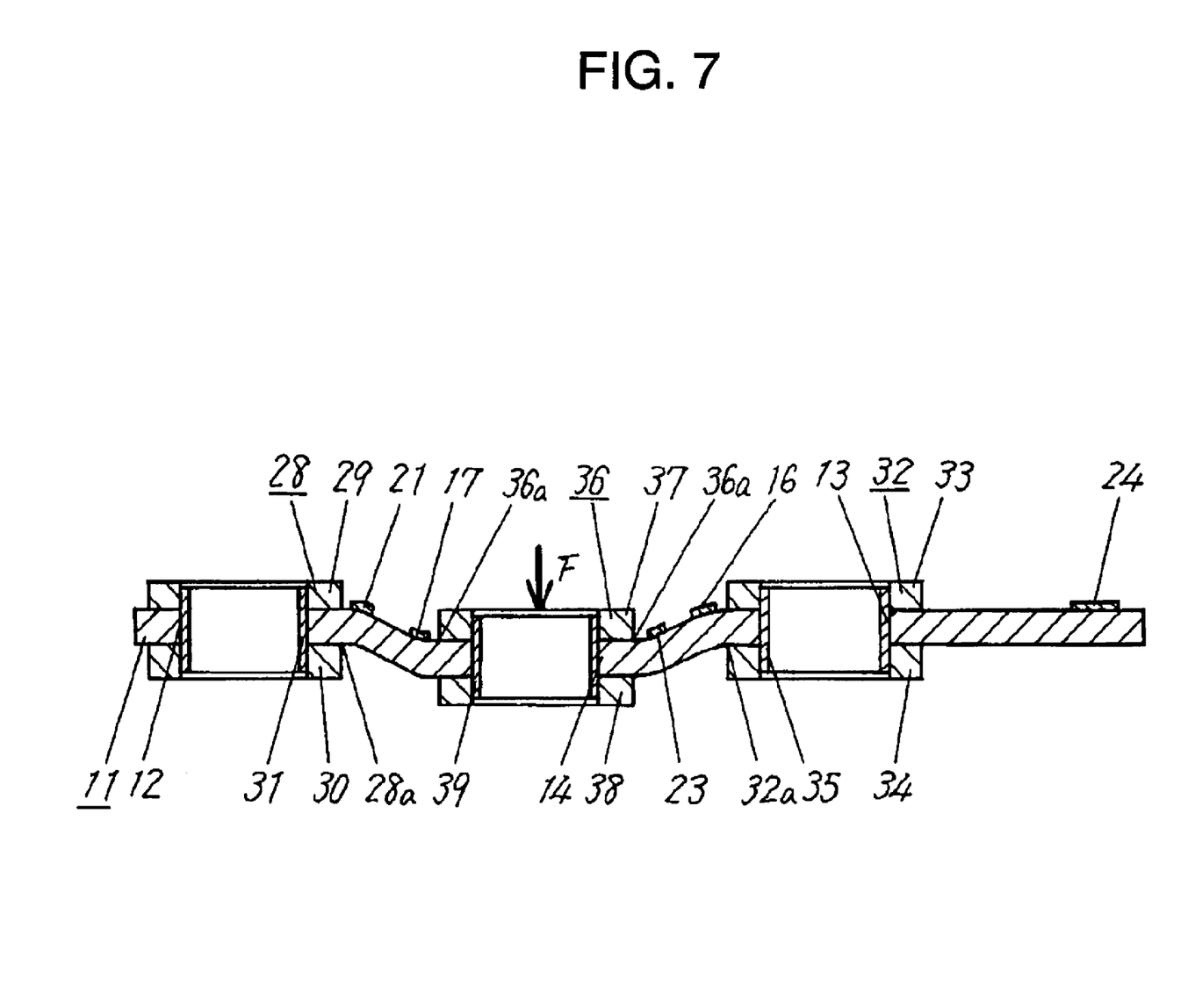
FIG. 7 is a side sectional view showing an operational state of the strain sensor in the preferred embodiment 1.

FIG. 7 is a side sectional view showing the operational state of the strain sensor in the preferred embodiment 1 of the present invention.

As shown in FIG. 7, when external force F is applied to detecting member 36 from the upper side, external force F causes sensor substrate 11 to be deformed.

Then, an external force is applied to end portion 36a of detecting member 36 which is in contact with sensor substrate 11. Simultaneously, a force (reaction force) in the opposite direction of the external force is applied to the end portion 28a of first fixing member 28 which is in contact with sensor substrate 11. Also, a reaction force is also applied to end portion 32a of second fixing member 32 which is contact with sensor substrate 11.

In this case, tensile stresses in the lengthwise direction of sensor substrate 11 are applied to first strain detecting element 16 and third strain detecting element 21 disposed on the top surface of sensor substrate 11. Due to the tensile stresses, the resistance values of first strain detecting element 16 and third strain detecting element 21 become increased in the lengthwise direction of sensor substrate 11.

At the same time, compressive stresses in the lengthwise direction of sensor substrate 11 are applied to second strain detecting element 17 and fourth strain detecting element 23. The resistance values of second strain detecting element 17 and fourth strain detecting element 23 become decreased in the lengthwise direction of sensor substrate 11.

Further, first strain detecting element 16, second strain detecting element 17, third strain detecting element 21 and fourth strain detecting element 23 are connected to each other by circuit patterns, thereby configuring a bridge circuit. And, the potential difference between first output electrode 19 and second output electrode 20 is differentially amplified and outputted by IC 24.

The external force F applied to detecting member 36 is detected from external output electrode 25 according to the output voltage of IC 24.

Incidentally, locking means 11b is preferable to be configured as described in the following.

At the inner sides of first upper washer 29, first lower washer 30 and first fixing hole 12 of first fixing member 28 are respectively provided with protrusions (not shown) instead of recesses. The outer side of first cylinder 31 is locked by the protrusions (not shown).

Further, at the inner sides of second upper washer 33, second lower washer 34 and the second fixing hole 13 of the second fixing member 32 are respectively provided with protrusions (not shown) instead of recesses. The outer side of the second cylinder 35 is locked by the protrusions (not shown).

Further, at the inner sides of the detector upper washer 37, the detector lower washer 38 and detecting hole 14 of detecting member 36 are respectively provided with protrusions (not shown) instead of recesses. The outer side of detecting cylinder 39 is locked by the protrusions (not shown).

Even in the case of configuring the locking means (not shown) as described above, the same function as in the configuration described earlier can be obtained by the preferred embodiment 1.

(Preferred Embodiment 2)

The preferred embodiment 2 will be described in the following with reference to FIG. 8 to FIG. 12.

Figure 8:
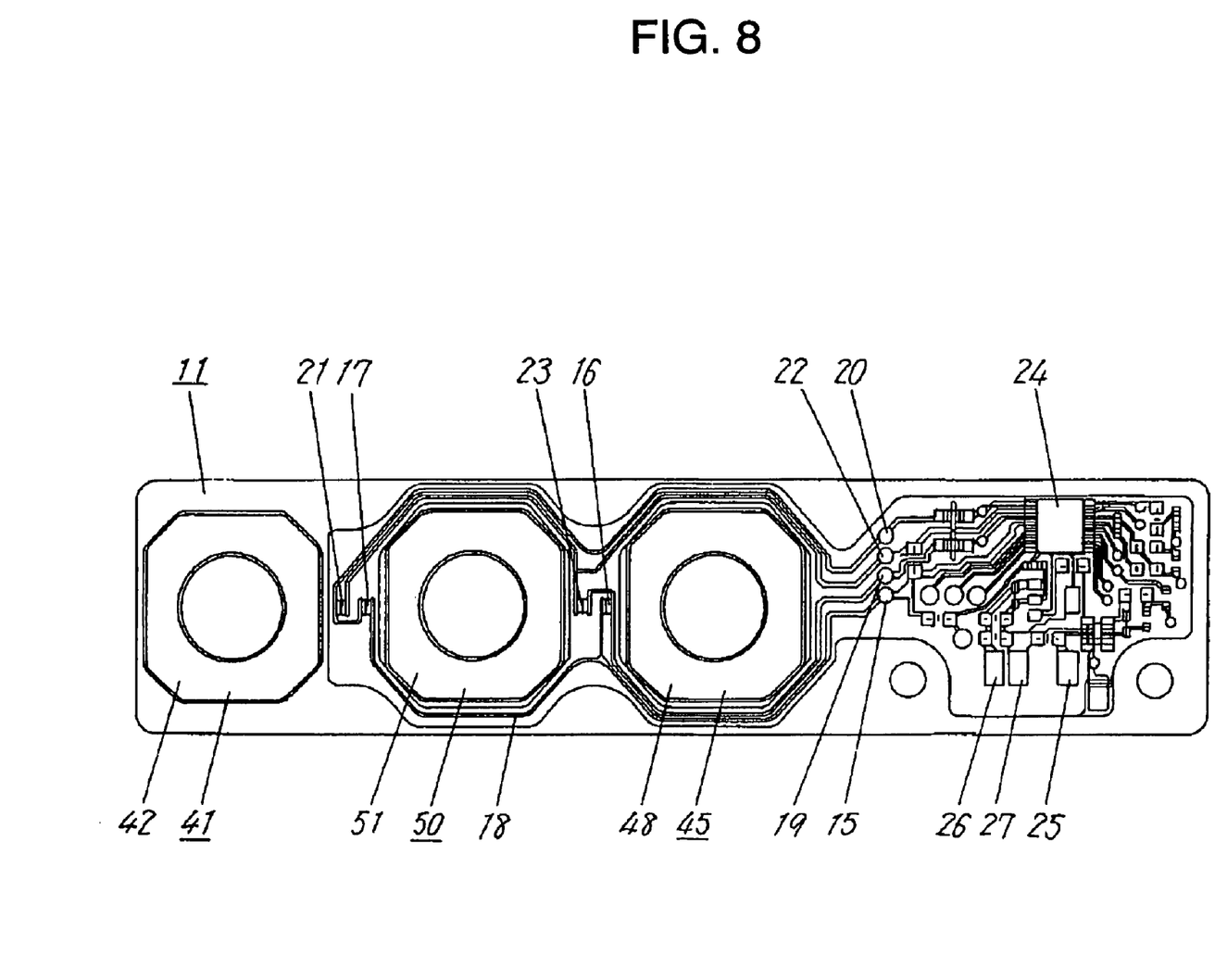
FIG. 8 is a top view of a strain sensor in the preferred embodiment 2 of the present invention.

FIG. 8 is a top view of a strain sensor in the preferred embodiment 2 of the present invention.

Figure 9:
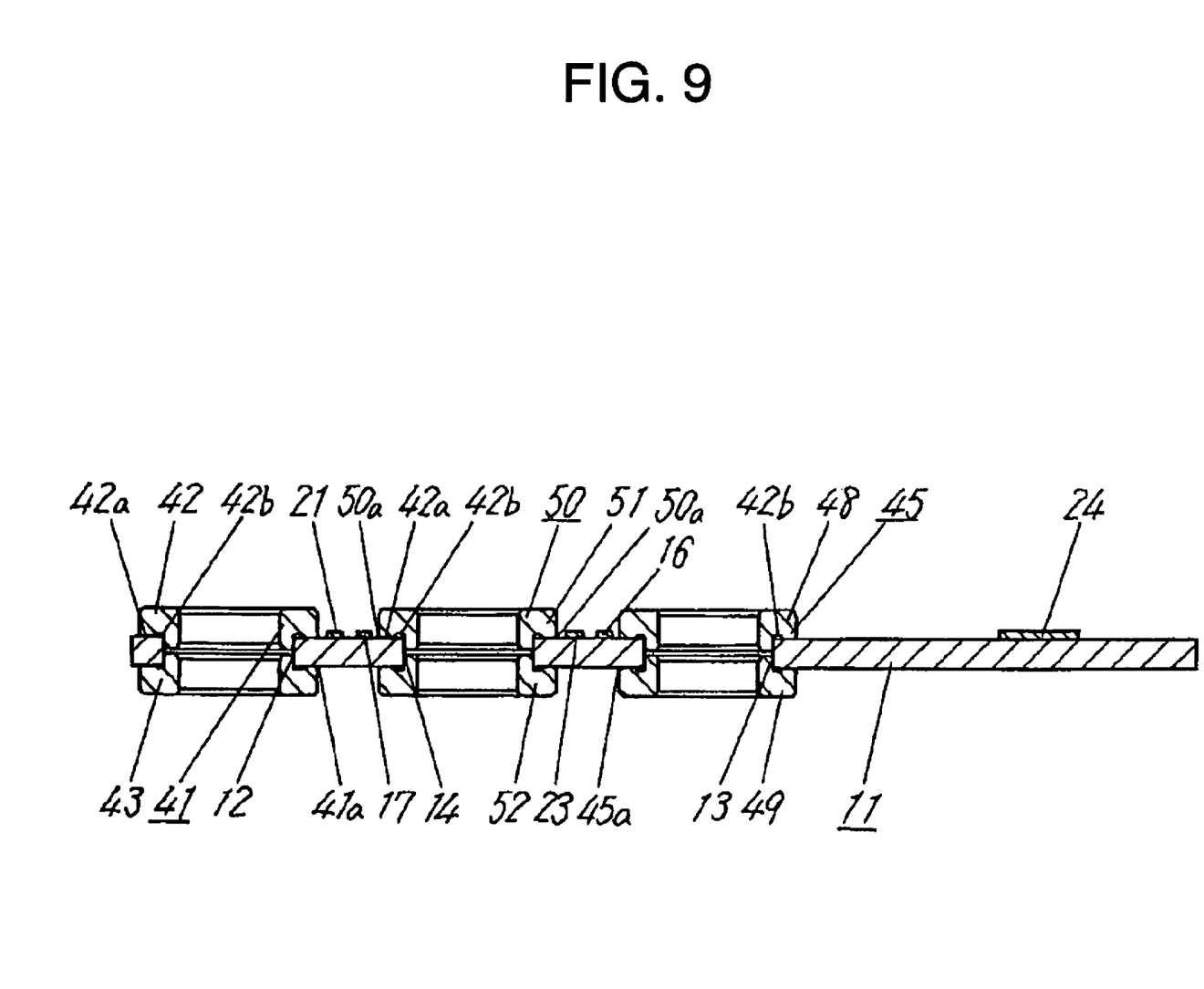
FIG. 9 is a side sectional view of a strain sensor in the preferred embodiment 2.

FIG. 9 is a side sectional view of the strain sensor.

Figure 10:
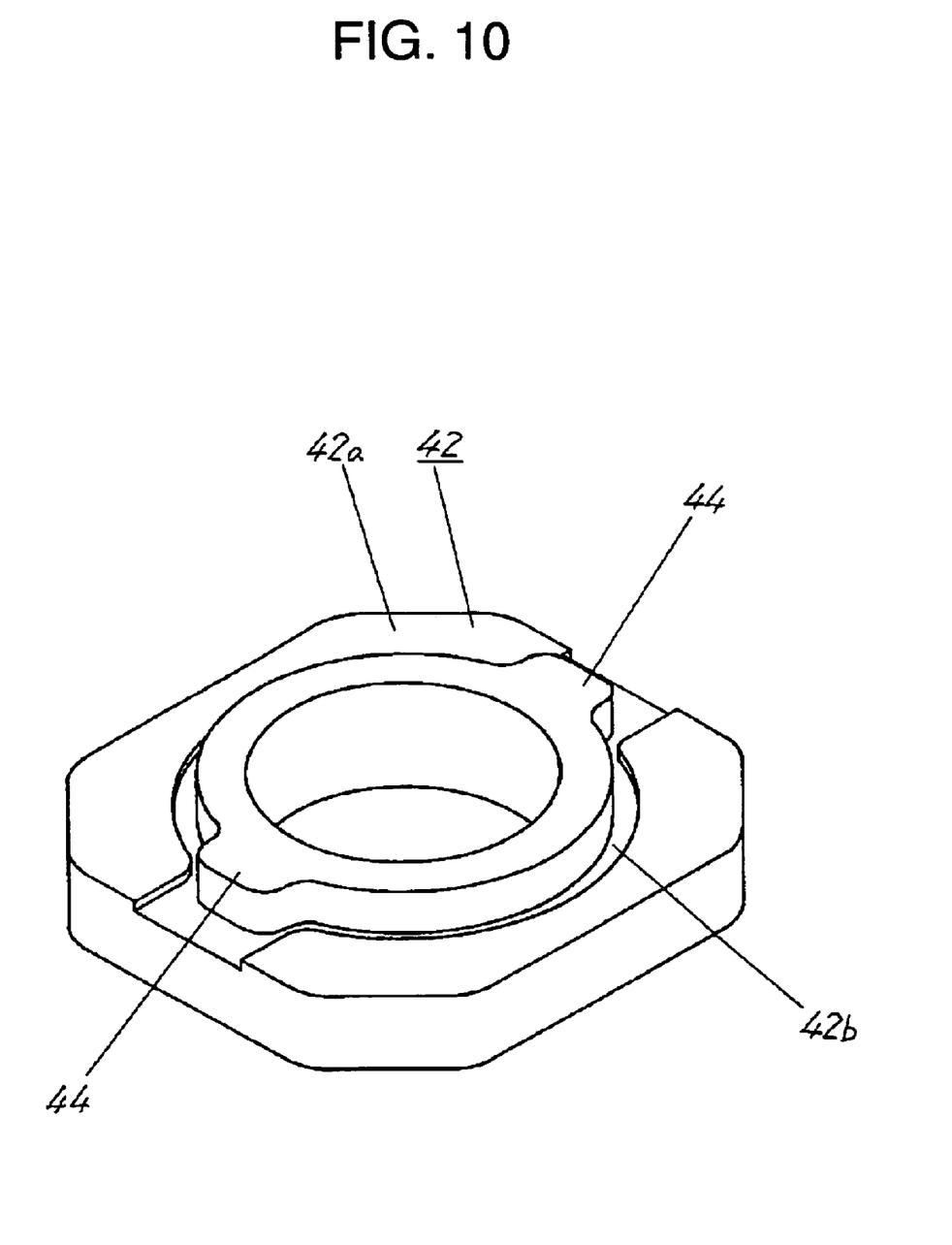
FIG. 10 is a perspective view of a first upper washer, which is an essential portion of the strain sensor, in the preferred embodiment 2.

FIG. 10 is a perspective view of a first upper washer of the strain sensor.

Figure 11:
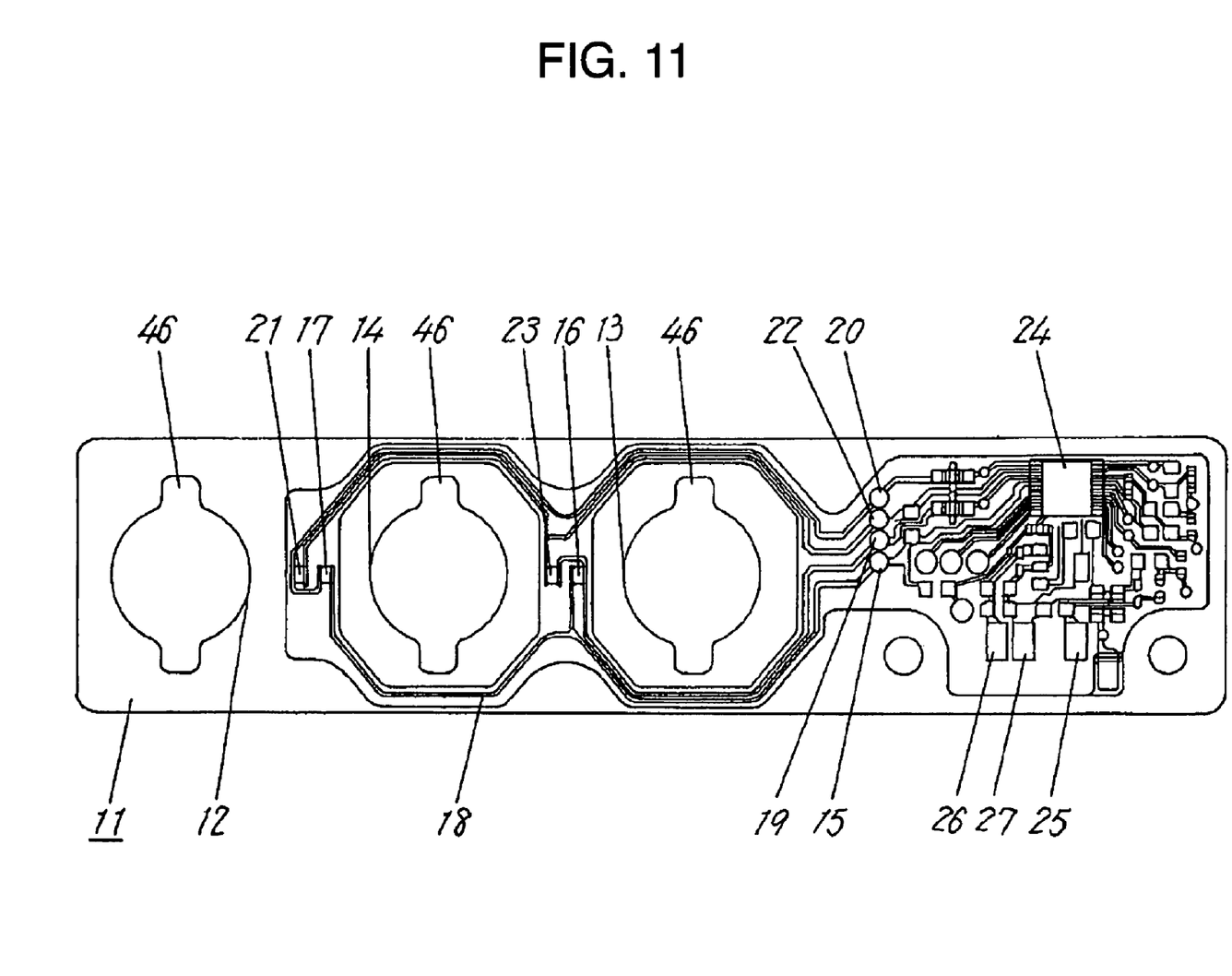
FIG. 11 is a top view of a sensor substrate, which is an essential portion of the strain sensor, in the preferred embodiment 2.

FIG. 11 is a top view of a sensor substrate of the strain sensor.

Figure 12:
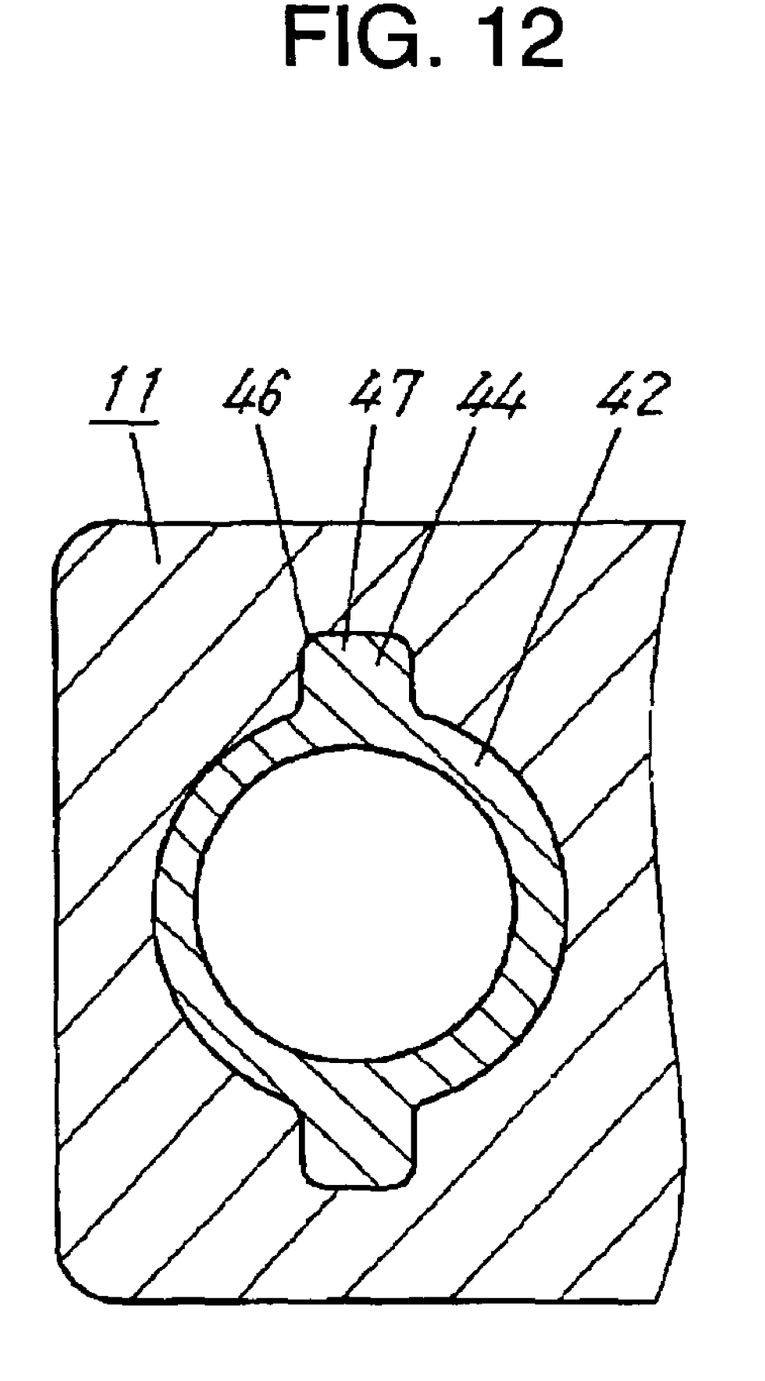
FIG. 12 is a sectional view showing the structure of a locking means for locking a first fixing member to the sensor substrate, which is an essential portion of the strain sensor, in the preferred embodiment 2.

FIG. 12 is a sectional view showing the structure of a locking means for locking a first fixing member to the sensor substrate of the strain sensor.

Those having the same configurations as in the preferred embodiment 1 of the present invention are given the same reference numerals, and the description is omitted.

As shown in FIG. 8 to FIG. 12, first fixing member 41, second fixing member 45 and detecting member 50 of the strain sensor in the preferred embodiment 2 are configured as described in the following.

First fixing member 41 includes first upper washer 42 and first lower washer 43.

First upper washer 42 is press-fitted into first fixing hole 12 and comes in contact with the top surface of sensor substrate 11. First lower washer 43 is press-fitted into first fixing hole 12 and comes in contact with the underside of sensor substrate 11.

As shown in FIG. 10, first upper washer 42 has protrusion 44. Also, first lower washer 43 has protrusion 44 as well.

These protrusions 44 are fitted in recesses 46 provided in first fixing hole 12 of sensor substrate 11 shown in FIG. 11. Thus, as shown in FIG. 12, locking means 47 of first fixing member 41 is configured.

Further, relief groove 42b is provided at the inner side of contact portion 42a at which first upper washer 42 and first lower washer 43 comes in contact with sensor substrate 11.

Also, second fixing member 45 includes second upper washer 48 and second lower washer 49.

Second upper washer 48 is press-fitted into second fixing hole 13 and comes in contact with the top surface of sensor substrate 11. Second lower washer 49 is press-fitted into second fixing hole 13 and comes in contact with the underside of sensor substrate 11.

Further, second upper washer 48 and second lower washer 49 are respectively provided with protrusions 44. These protrusions 44 are fitted in recesses 46 of second fixing hole 13 of sensor substrate 11.

Locking means 47 of second fixing member 45 is configured as described above.

Further, relief groove 42b is provided at the inner side of contact portion 42a at which second upper washer 48 and second lower washer 49 comes into contact with sensor substrate 11.

Also, detecting member 50 includes detector upper washer 51 and detector lower washer 52.

Detector upper washer 51 is press-fitted into detecting hole 14 and comes in contact with the top surface of sensor substrate 11. Detector lower washer 52 is press-fitted into detecting hole 14 and comes in contact with the underside of sensor substrate 11.

Further, detector upper washer 51 and detector lower washer 52 are respectively provided with protrusions 44. These protrusions 44 are fitted in recesses 46 of detecting hole 14 of sensor substrate 11.

Locking means 47 of detecting member 50 is configured as described above.

Further, relief grooves 42b is provided at the inner sides of contact portions 42a which detector upper washer 51 and detector lower washer 52 respectively come in contact with sensor substrate 11.

As described above, in the preferred embodiment 2 of the present invention, first fixing member 41, second fixing member 45 and detecting member 50 are press-fitted in sensor substrate 11. Simultaneously formed are end portion 41a, end portion 45a and end portion 50a at which first fixing member 41, second fixing member 45 and detecting member 50 respectively come in contact with sensor substrate 11.

Accordingly, it is possible to provide a strain sensor reduced in the number of parts and man-hour for assembling.

Also, according to the method as described earlier, locking means 47 is configured for first fixing member 41, second fixing member 45 and detecting member 50. That is, locking means 47 can be formed only by press-fitting first fixing member 41, second fixing member 45 and detecting member 50 into sensor substrate 11.

Accordingly, it is possible to provide a strain sensor reduced in man-hour for assembling.

Here, as described in the preferred embodiment 1, when first fixing hole 12, second fixing hole 13 and detecting hole 14 are formed by press machining in a metallic base material (not shown) used as sensor substrate 11, burrs may be generated around first fixing member 12, second fixing hole 13 and detecting hole 14 of the base material (not shown).

In the strain sensor in the preferred embodiment 2 of the present invention, relief grooves 42b is provided at the inner sides of contact portions 42a at which first upper washer 42, first lower washer 43, second upper washer 48, second lower washer 49, detector upper washer 51 and detector lower washer 52 respectively come in contact with sensor substrate 11.

Accordingly, when first upper washer 42, first lower washer 43, second upper washer 48, second lower washer 49, detector upper washer 51 and the detector lower washer 52 are press-fitted in the sensor substrate 11, burrs generated on sensor substrate 11 will get into relief grooves 42b. Consequently, first upper washer 42, first lower washer 43, second upper washer 48, second lower washer 49, detector upper washer 51 and detector lower washer 52 will not come loose against sensor substrate 11 but may come in tight contact with sensor substrate 11.

Thus, end portion 50a of detecting member 50, end portion 41a of first fixing member 41, and end portion 45a of second fixing member 45 are stabilized with respect to their positions. Accordingly, it is possible to further improve the output accuracy of the strain sensor.

Also, locking means 47 may be configured as described in the following.

Recesses (not shown) provided in place of protrusions engage first upper washer 42 and first lower washer 43, and protrusions (not shown) provided in place of recesses engage the sensor substrate.

Further, recesses (not shown) provided in place of protrusions engage second upper washer 48 and second lower washer 49, and protrusions (not shown) provided in place of recesses engage sensor substrate 11.

Further, recesses (not shown) provided in place of protrusions engage detector upper washer 51 and detector lower washer 52, and protrusions (not shown) provided in place of recesses engage sensor substrate 11.

Even in the case of configuring the locking means (not shown) as described above, the same function as in the configuration described earlier can be obtained by the preferred embodiment 2. Also, it is possible to provide a strain sensor reduced in man-hour for assembling.

INDUSTRIAL APPLICABILITY

In the strain sensor of the present invention, when an external force is applied to the end portion where the detecting member press-fitted into the detecting hole of the sensor substrate comes in contact with the sensor substrate, a force (reaction force) in the opposite direction to the external force is applied to the end portions where the first fixing member and the second fixing member respectively come in contact with the sensor substrate. In this case, the first fixing member is press-fitted into the first fixing hole of the sensor substrate. The second fixing member is press-fitted into the second fixing hole of the sensor substrate. In this configuration, when an external force is applied, the end portions where the detecting member, the first fixing member and the second fixing member come in contact with the sensor substrate are free from positional shifting. Accordingly, the bending stress applied to the strain detecting element is stabilized. As a result, the output accuracy of the strain detecting element is stabilized, and it is possible to provide a strain sensor improved in output accuracy.

The invention claimed is:

1. A strain sensor, comprising:
a sensor substrate provided with a first fixing hole and a second fixing hole, a detecting hole between the first fixing hole and the second fixing hole, and at least one strain detecting element;
a first fixing member press-fitted into the first fixing hole;
a second fixing member press-fitted into the second fixing hole; and
a detecting member press-fitted into the detecting hole, wherein
the first fixing member includes
a first upper washer coming in contact with an upper surface of said sensor substrate and
a first lower washer coming in contact with a lower surface of said sensor substrate,
the second fixing member includes
a second upper washer coming in contact with an upper surface of said sensor substrate, and
a second lower washer coming in contact with a lower surface of said sensor substrate,
wherein strain of the sensor substrate due to a positional shift of said detecting member in relation to the first fixing member and the second fixing member is detected by the strain detecting element when an external force is applied to said detecting member.

2. The strain sensor of claim 1,
wherein each of the first fixing member, the second fixing member and the detecting member has a locking means.

3. The strain sensor of claim 1,
wherein the first fixing member further includes:
a first thin cylinder which is press-fitted into inner surfaces of the first upper washer and the first lower washer; and
the second fixing member further includes:
a second thin cylinder which is press-fitted into inner surfaces of the second upper washer and the second lower washer; and
the detecting member includes:
a detector upper washer coming in contact with an upper surface of said sensor substrate,
a detector lower washer coming in contact with a lower surface of said sensor substrate, and
a detecting thin cylinder which is press-fitted into inner side surfaces of the detector upper washer and the detector lower washer.

4. The strain sensor of claim 3,
wherein recesses or protrusions for locking an outer side surface of the first cylinder are provided at the inner side surfaces of the first upper washer, the first lower washer, and the first fixing hole,
recesses or protrusions for locking an outer side of the second cylinder are provided at the inner side surfaces of the second upper washer, the second lower washer, and the second fixing hole, and
recesses or protrusions for locking an outer side surface of the detecting cylinder are provided at the inner side surfaces of the detector upper washer, the detector lower washer, and the detecting hole.

5. The strain sensor of claim 1,
wherein in the first fixing member,
the first upper washer is press-fitted into the first fixing hole, and
the first lower washer is press-fitted into the first fixing hole, and
in the second fixing member, the second upper washer is press-fitted into the second fixing hole, and the second lower washer is press-fitted into the second fixing hole, and said detecting member includes:

a detector upper washer which is press-fitted into the detecting hole and comes in contact with an upper surface of said sensor substrate, and a detector lower washer which is press-fitted into the detecting hole and comes in contact with a lower surface of said sensor substrate.

6. The strain sensor of claim 5, wherein the first upper washer and the first lower washer are respectively provided with recesses or protrusions, and the first fixing hole is provided with protrusions or recesses;

the recesses of the first upper washer and the first lower washer engage the projections of the first fixing hole, or the protrusions of the first upper washer and the first lower washer engage the recesses of the first fixing hole;

the second upper washer and the second lower washer are respectively provided with recesses or protrusions, and the second fixing hole is provided with protrusions or recesses;

the recesses of the second upper washer and the second lower washer engage the projections of the second fixing hole, or the protrusions of the second upper washer and the second lower washer engage the recesses of the second fixing hole;

the detector upper washer and the detector lower washer are respectively provided with recesses or protrusions, and the detecting hole is provided with protrusions or recesses; and the recesses of the detector upper washer and the detector lower washer engage the projections of the detecting hole, or the protrusions of the detector upper washer and the detector lower washer engage the recesses of the detecting hole.

7. The strain sensor of claim 5, wherein the first upper washer, the first lower washer, the second upper washer, the second lower washer, the detector upper washer, and the detector lower washer is provided with a relief groove at an inner side of an contact portion thereof coming in contact with said sensor substrate.

* * * * *